US008169964B2

(12) United States Patent
Kolding et al.

(10) Patent No.: US 8,169,964 B2
(45) Date of Patent: May 1, 2012

(54) ADAPTIVE SCHEME FOR LOWERING UPLINK CONTROL OVERHEAD

(76) Inventors: Troels Kolding, Klarup (DK); Frank Frederiksen, Klarup (DK)

( * ) Notice: Subject to any disclaimer, the term of this patent is extended or adjusted under 35 U.S.C. 154(b) by 1209 days.

(21) Appl. No.: 11/906,324

(22) Filed: Oct. 1, 2007

(65) Prior Publication Data

US 2008/0080423 A1 Apr. 3, 2008

Related U.S. Application Data

(60) Provisional application No. 60/849,150, filed on Oct. 2, 2006.

(51) Int. Cl.
*H04W 4/00* (2009.01)
*H04J 3/00* (2006.01)
*H04B 7/212* (2006.01)
*H04J 3/02* (2006.01)

(52) U.S. Cl. ........ 370/330; 370/345; 370/348; 370/462; 370/498; 370/436

(58) Field of Classification Search .......... 370/328–330, 370/345, 347, 348, 462, 498, 436
See application file for complete search history.

(56) References Cited

U.S. PATENT DOCUMENTS

| 2002/0141355 | A1* | 10/2002 | Struhsaker et al. | 370/280 |
|---|---|---|---|---|
| 2002/0150058 | A1* | 10/2002 | Kim et al. | 370/280 |
| 2003/0063583 | A1* | 4/2003 | Padovani et al. | 370/329 |
| 2003/0091033 | A1* | 5/2003 | Van den Boeck et al. | 370/352 |
| 2003/0142649 | A1 | 7/2003 | Taniguchi | 370/347 |
| 2003/0189918 | A1 | 10/2003 | Das et al. | 370/349 |
| 2004/0042492 | A1 | 3/2004 | Suzuki et al. | 370/473 |
| 2006/0251015 | A1* | 11/2006 | Khan | 370/329 |
| 2007/0171864 | A1 | 7/2007 | Zhang et al. | 370/329 |
| 2008/0004029 | A1* | 1/2008 | Moilanen | 455/450 |

FOREIGN PATENT DOCUMENTS

| GB | 2377343 | 1/2003 |
|---|---|---|
| WO | WO2008/041089 | 4/2008 |

OTHER PUBLICATIONS

3GPP TS 36.211 V8.1.0 (Nov. 2007) 3$^{rd}$ Generation Partnership Project; Technical Specification Group Radio Access Network; Evolved Universal Terrestrial Radio Access (E-UTRA); Physical Channels and Modulation (Release 8).

* cited by examiner

*Primary Examiner* — Ronald Abelson

(57) ABSTRACT

The present invention is related to methods, apparatuses, systems and computer software for determining an amount of physical resources for downlink transmission, and allocating uplink physical resources for transmission of data-non-associated control signaling based at least on the amount of physical resources for downlink transmission. The amount of physical resources for downlink transmission comprises an amount of downlink control signaling. The present invention further relates to a framework for mapping the dedicated uplink control channels directly to single physical resource blocks. The framework is able to efficiently shift physical resources to and from the uplink control channel for ACK/NACK reports, in a data-non-associated control signaling scheme and on a per subframe basis. The present invention is also concerned with scheduler, for example an eNodeB scheduler, which uses its scheduling history and knowledge of user equipment capabilities to increase utilization of uplink resources.

23 Claims, 6 Drawing Sheets

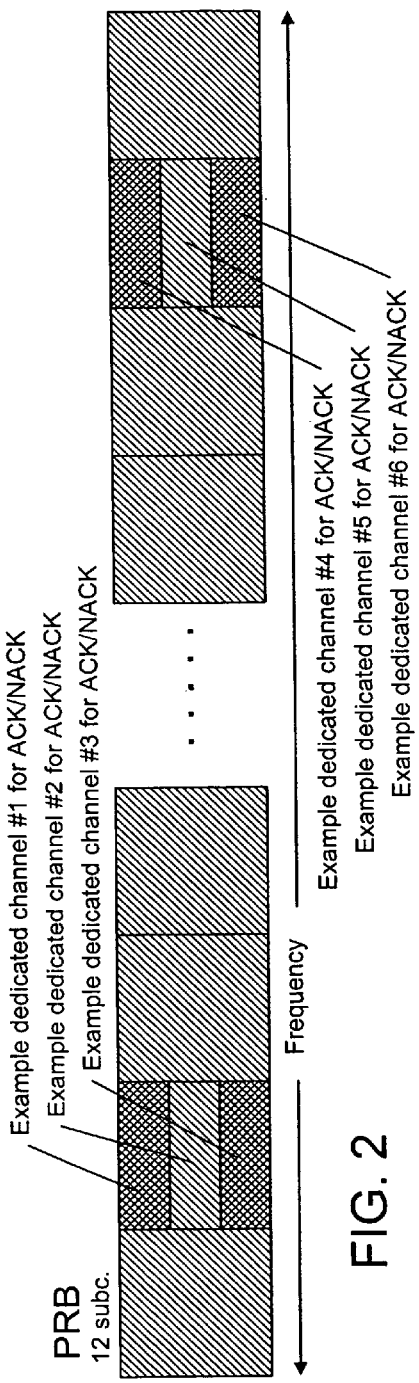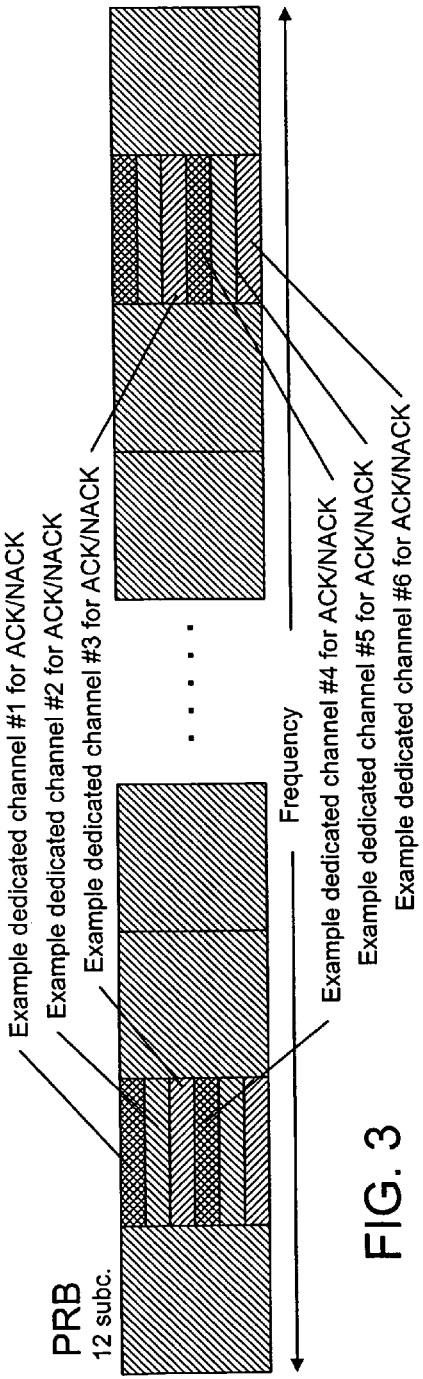

ADAPTIVE SCHEME FOR LOWERING UPLINK CONTROL OVERHEAD

CROSS REFERENCE TO RELATED APPLICATIONS

This application claims the benefit of U.S. Provisional Application No. 60/849,150, filed Oct. 2, 2006.

FIELD OF THE INVENTION

The present invention relates to wireless communication, and more particularly to transmission in a Universal Mobile Telecommunications System (UMTS) Terrestrial Radio Access Network (UTRAN) or long term evolutions of UTRAN.

BACKGROUND OF THE INVENTION

LTE, or Long Term Evolution, is a name for research and development involving the Third Generation Partnership Project (3GPP), to identify technologies and capabilities that can improve systems such as the UMTS. The present invention involves the long term evolution (LTE) of 3GPP. Implementations of wireless communication systems, such as UMTS (Universal Mobile Telecommunication System), may include a radio access network (RAN). In UMTS, the RAN is called UTRAN (UMTS Terrestrial RAN). Of interest to the present invention is an aspect of LTE referred to as "evolved UMTS Terrestrial Radio Access Network," or E-UTRAN.

In general, in E-UTRAN resources are assigned more or less temporarily by the network to one or more user equipment terminals (UE) by use of allocation tables, or more generally by use of a downlink resource assignment channel. Users are generally scheduled on a shared channel every transmission time interval (TTI) by a Node B or an evolved Node B (e-Node B). A current working assumption for LTE is that users are explicitly scheduled on a shared channel every transmission time interval (TTI) by an eNodeB. An eNodeB is an evolved Node B and is the UMTS LTE counterpart to the term "base station" in the Global System for Mobile Communication (GSM). In order to facilitate the scheduling on the shared channel, the e-Node B transmits an allocation in a downlink control channel to the UE. The allocation information may be related to both uplink and downlink channels. The allocation information may include information about which resource blocks in the frequency domain are allocated to the scheduled user(s), which modulation and coding schemes to use, what the transport block size is, and the like.

An example of the E-UTRAN architecture is illustrated in FIG. 1. This example of E-UTRAN consists of eNodeBs, providing the E-UTRA user plane (RLC/MAC/PHY) and control plane (RRC) protocol terminations towards the UE. The eNodeBs are interconnected with each other by means of the X2 interface. The eNodeBs are also connected by means of the S1 interface to the EPC (evolved packet core) more specifically to the MME (mobility management entity) and the UPE (user plane entity). The S1 interface supports a many-to-many relation between MMEs/UPEs and eNodeBs. The S1 interface supports a functional split between the MME and the UPE. The MMU/UPE in the example of FIG. 1 is one option for the access gateway (aGW).

In the example of FIG. 1, there exists an X2 interface between the eNodeBs that need to communicate with each other. For exceptional cases (e.g. inter-PLMN handover), LTE_ACTIVE inter-eNodeB mobility is supported by means of MME/UPE relocation via the S1 interface.

The eNodeB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNodeBs, security control, IP header compression and encryption of user data streams; termination of U-plane packets for paging reasons; switching of U-plane for support of UE mobility, idle state mobility control, SAE bearer control, and ciphering and integrity protection of NAS signaling. The invention is related to LTE, although the solution of the present invention may also be applicable to present and future systems other than LTE.

In general, E-UTRAN may use orthogonal frequency division multiplexing (OFDM) as the multiplexing technique for a downlink connection between the eNode B and the UE terminal, in which different system bandwidths from 1.25 MHz to 20 MHz are applied. Using OFDM may allow for link adaptation and user multiplexing in the frequency domain. However, to utilize the potential of multiplexing in the frequency domain the Node B or eNode B needs to have information related to the instantaneous channel quality. In order for the Node B or eNode B to be informed of the channel quality, the user equipment terminal provides channel quality indicator (CQI) reports to the eNode B. The user equipment terminal may periodically or in response to a particular event send CQI reports to the respective serving e-Node B, which indicate the recommended transmission format for the next transmission time interval (TTI). The report may be constructed in such a way that it indicates the expected supported transport block size under certain assumptions, which may include, the recommended number of physical resource blocks (PRB), the supported modulation and coding scheme, the recommended multiple input multiple output (MIMO) configuration, as well as a possible power offset.

In general, the interface between a user equipment (UE) and the UTRAN or E-UTRAN has been realized through a radio interface protocol established in accordance with radio access network specifications describing a physical layer (L1), a data link layer (L2) and a network layer (L3). For example, the physical layer (PHY) provides information transfer service to a higher layer and is linked via transport channels to a medium access control (MAC) layer of the second layer (L2). Data travels between the MAC layer at L2 and the physical layer at L1, via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

Typically, the second layer (L2) may include the MAC layer, a radio link control (RLC) layer, a broadcast/multicast control (BMC) layer, and a packet data convergence protocol (PDCP) layer. The MAC layer maps various logical channels to various transport channels. The MAC layer also multiplexes logical channels by mapping several logical channels to one transport channel. The MAC layer is connected to an upper RLC layer via the logical channel. The logical channel can be divided into a control channel for transmitting control plane information, such as control signaling, and a traffic channel for transmitting user plane information, such as data information.

Due to the different capabilities of the eNodeB and UE, the downlink (DL) and uplink (UL) physical layers for LTE may be different. Physical channels convey information from higher layers in the LTE stack, and physical signals may be used exclusively for use in the physical layer. Physical channels map to transport channels, which are service access points (SAPs) for the L2/L3 layers. The downlink physical channels are Physical Downlink Shared Channel (PDSCH), which is used for data and multimedia transport, Physical Downlink Control Channel (PDCCH), which conveys UE-specific control information, and Common Control Physical Channel (CCPCH), which is used to carry cell-wide control information. There are two types of physical signals, reference signals used to determine the channel impluse response (CIR), and synchronization signals which convey network timing information. The downlink transport channels are Broadcast Channel (BCH), Downlink Shared Channel (DL-SCH), Paging Channel (PCH), and Multicast Channel (MCH).

In the uplink, the physical channels are Physical Uplink Shared Channel (PUSCH) and Physical Uplink Control Channel (PUCCH), which carry control information such as channel quality indication (CQI), ACK/NACK, HARQ and uplink scheduling requests. The uplink physical signals are uplink reference signal and random access preamble. The uplink transport channels are Uplink Shared Channel (UL SCH) and Randon Access Channel (RACH).

In order to facilitate the scheduling on the shared channel, the eNodeB transmits an allocation in a downlink shared control channel to the user equipment (UE). The allocation information will often be related to both uplink and downlink. In LTE for example, if the UE is scheduled for both uplink and downlink transmission the UE may receive two allocation grants, one for the uplink and one for the downlink. The functionality of the allocation is in principle similar to the high speed shared control channel (HS-SCCH), which is used for high speed downlink packet access (HSDPA).

The allocation is used to signal which user(s) are going to be scheduled in each TTI. The current default assumption in 3GPP is that the allocation includes information about which resource blocks in the frequency domain are allocated to scheduled user(s), which modulation scheme to use, what the transport block size is, and the like. The allocation also often includes various information related to hybrid automatic repeat requests (HARQ).

The current working assumption of an evolved UTRAN is that LTE will be using Orthogonal Frequency Division Multiplexing Access (OFDMA) as the multiplexing technique in the downlink direction, where multiple users can be frequency multiplexed in the downlink direction with a single TTI (which will have the duration of two sub-frames, i.e., 1 ms). One of the key elements for efficient link operation is the utilization of HARQ, such that for each transmitted packet, physical resources will be allocated in the uplink, so that each allocated UE can transmit HARQ acknowledgement or negative acknowledgement (ACK/NACK) based on its reception. The assumption for the downlink is that HARQ is asynchronous, but it is expected that the UE's transmission of ACK and NACK will be time-wise tied to the received transmission. In cases where UE does not have data to transmit in the uplink at the time of ACK/NACK, a dedicated physical control channel is assumed to carry the ACK/NACK bit. Otherwise, the ACK/NACK could also be piggy-backed to the data transmission. Both the allocation in uplink and downlink is decided and controlled by the eNodeB.

The number of users multiplexed in downlink may change significantly from sub-frame to sub-frame. Some of the factors contributing to such variations include changes in traffic (burstiness) which means that varying number of users have different and fast varying amounts of data to transmit, or properties of radio-aware scheduling that have changes in number of users allocated per sub-frame.

Given that the traffic is asymmetrical (or time-alternating as in the case of VoIP (Voice over Internet Protocol), it will often happen that ACK/NACK need be sent in uplink as data-non-associated transmission, or transmission on a separate physical channel tied to the downlink allocation, for example. Such resources need be reserved and provided if no adaptive mechanism is available, and we need to allocate the resources according to the worst-case multiplexing amount. This causes a loss in system capacity. Therefore, there is a need to overcome the problems discussed above.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention is related to a framework for mapping the dedicated uplink control channels directly to single physical resource blocks (PRBs). The framework is able to efficiently shift physical resources to and from the uplink control channel for ACK/NACK reports, in a data-non-associated control signaling scheme and on a per subframe basis. The present invention is also concerned with scheduler, for example an eNodeB scheduler, which uses its scheduling history and knowledge of user equipment (UE) capabilities to increase utilization of uplink resources.

When an eNodeB is used to schedule users on a shared channel in a transmission time interval, it allocates the uplink physical resources for ACK/NACK at least partly based on the current amount of the physical resources for downlink transmission, or the allocation history of the downlink transmission. The amount of physical resources for downlink transmission is determined at least partly based on the number of users and/or the number of packets multiplexed within a downlink subframe in a physical resource block. The eNodeB is also adapted to allocate uplink physical resources for data transmission based on amount of physical resources allocated for transmission of ACK/NACK reports.

For delayed uplink allocation, the amount of allocated physical resources for ACK/NACK reports is also estimated based whether some of the ACK/NACK reports can be piggy-backed to uplink data transmission.

In accordance with a first aspect of the invention, a method is provided that includes determining an amount of physical resources for downlink transmission, and allocating uplink physical resources for transmission of data-non-associated control signaling based at least on the amount of physical resources for downlink transmission. The amount of physical resources for downlink transmission may include an amount of downlink control signaling.

In accordance with the first aspect of the invention, determining the amount of physical resources for downlink transmission is at least partly based on number of user equipment terminals multiplexed within a downlink subframe in a physical resource block.

In accordance with the first aspect of the invention, determining the amount of physical resources for downlink transmission is at least partly based on a number of packets multiplexed within a downlink subframe in a physical resource block.

In accordance with the first aspect of the invention, the method may further include allocating uplink physical resources for data transmission based at least on the amount of uplink physical resources allocated for transmission of data-non-associated control signaling.

In accordance with the first aspect of the invention, determining the amount of physical resources for downlink transmission is based on whether the data-non-associated control signaling is at least partly incorporated into uplink data transmission.

In accordance with the first aspect of the invention, the amount of physical resources for downlink transmission comprises physical resources allocated for current transmission.

In accordance with the first aspect of the invention, the amount of physical resources for downlink transmission comprises physical resources allocated for past transmission.

In accordance with the first aspect of the invention, the user equipment terminals include user equipment terminals in semi-static locations.

In accordance with the first aspect of the invention, uplink control channel boundaries for each of the user equipment terminals are allocated within boundaries of a single physical resource block.

In accordance with a second aspect of the invention, an apparatus is provided that may include a determiner for determining an amount of physical resources for downlink transmission, and an allocation unit for allocating uplink physical resources for transmission of data-non-associated control signaling based at least on the amount of physical resources for downlink transmission. The amount of physical resources for downlink transmission may include an amount of downlink control signaling.

In accordance with the second aspect of the invention, the apparatus may also include a recorder for recording a number of user equipment terminals multiplexed within a downlink subframe in a physical resource block, and the determiner is responsive to the number of multiplexed user equipment terminals for determining the amount of physical resources for downlink transmission.

In accordance with the second aspect of the invention, the apparatus may also include a recorder for recording a number of packets multiplexed within a downlink subframe in a physical resource block, and the determiner is responsive to the number of multiplexed packets for determining the amount of physical resources for downlink transmission.

In accordance with the second aspect of the invention, the allocation unit is configured to allocate uplink physical resources for data transmission based at least on the amount of uplink physical resources allocated for transmission of data-non-associated control signaling.

In accordance with the second aspect of the invention, the determiner is configured to determine the amount of physical resources for downlink transmission based on whether the data-non-associated control signaling is at least partly incorporated into uplink data transmission.

In accordance with the second aspect of the invention, the amount of physical resources for downlink transmission includes physical resources allocated for current transmission.

In accordance with the second aspect of the invention, the amount of physical resources for downlink transmission includes physical resources allocated for past transmission.

In accordance with the second aspect of the invention, the user equipment terminals include user equipment terminals in semi-static locations.

In accordance with the second aspect of the invention, uplink control channel boundaries for each of the user equipment terminals are allocated within boundaries of a single physical resource block.

In accordance with the second aspect of the invention, the apparatus may be included in or is a network element.

In accordance with the second aspect of the invention, the apparatus may further include a scheduler for scheduling downlink packets, and a prediction module for predicting a number of expected reports based at least on the amount of physical resources for downlink transmission.

In accordance with a third aspect of the invention, an apparatus is provided that includes means for determining an amount of physical resources for downlink transmission, and means for allocating uplink physical resources for transmission of data-non-associated control signaling based at least on the amount of physical resources for downlink transmission. The amount of physical resources for downlink transmission comprises an amount of downlink control signaling.

In accordance with the third aspect of the invention, the apparatus may further include means for scheduling downlink packets, and means for predicting a number of expected reports based at least on the amount of physical resources for downlink transmission.

In accordance with a fourth aspect of the invention, a system is provided that includes a determiner for determining an amount of physical resources for downlink transmission, an allocation unit for allocating uplink physical resources for transmission of data-non-associated control signaling based at least on the amount of physical resources for downlink transmission, and at least one user equipment terminal responsive to the allocation of uplink physical resources for transmission of data non-associated control signaling for providing control signaling according to the allocation. The amount of physical resources for downlink transmission comprises an amount of downlink control signaling.

In accordance with the fourth aspect of the invention, the system may further include a network element that includes the determiner and the allocation unit.

In accordance with a fifth aspect of the invention, a computer program product is provided that includes a computer readable storage structure embodying computer program code thereon for execution by a computer processor, wherein said computer program code comprises instructions for performing a method including the steps of determining an amount of physical resources for downlink transmission, and allocating uplink physical resources for transmission of data-non-associated control signaling based at least on the amount of physical resources for downlink transmission.

BRIEF DESCRIPTION OF THE DRAWINGS

The above and other objects, features and advantages of the invention will become apparent from a consideration of the subsequent detailed description presented in connection with accompanying drawings, in which:

FIG. 2 illustrates an exemplary mapping scheme between dedicated uplink control channels and the physical resource block (PRB) structure, with 12 sub-carriers per PRB.

FIG. 3 illustrates similar exemplification of mapping of ACK/NACK control channel to PRB using a distributed method when several PRBs are reserved for control.

DETAILED DESCRIPTION OF THE INVENTION

Based on the physical resources that may be needed for sending an acknowledgement/negative acknowledgement (ACK/NACK) report, a network element, for example an evolved NodeB (eNode B), may reserve a significant signaling space for each transmission (tied to downlink packet transmission). For example, in WCDMA/HSDPA, it is possible to use a factor-10 repetition of the ACK/NACK bit as well as efficient frequency diversity by spreading. This means that the fading margin is rather small for the WCDMA case except when the signaling is in flat channel conditions.

Depending on the design of the control channels in LTE, it may be possible to have less frequency diversity. For example, in sending an ACK/NACK report in UTRAN LTE, it may be possible to use distributed transmission of the 10 repetitions. However, this may impact many physical resource blocks that could be used for data transmission, and there may be a need to reduce overhead. For example, using an added fading margin of 3 dB, about 4 sub-carriers (0.5 ms) per ACK/NACK report may be needed in order to obtain the same uplink coverage as is obtained in WCDMA/HSDPA. Therefore, according to an exemplary embodiment of the present invention, a physical resource block (PRB) defined as having 12 sub-carriers, it is possible to fit three ACK/NACK reports into the space corresponding to a single PRB.

For example, if there is a mixture of VoIP (Voice over Internet Protocol) and HTTP (Hypertext Transfer Protocol) transmissions occurring within a cell, it may be necessary to multiplex between a few to quite many packets every subframe, for example between 2-10 when using an opportunistic scheduler. Therefore, in the worst-case, space corresponding to four PRBs should be allocated, but on average less space may be allocated. Moreover, it may be possible to limit the scheduling flexibility in order to fix the number of multiplexed packets every transmission time interval (TTI). The same consideration may also be taken when dealing with RRC, SID TCP ACK, and TCP KAM messages.

According to an exemplary embodiment of the present invention uplink control signalling, for example ACK/NACK), may be setup as follows. Uplink control channel boundaries for every user are contained within a single PRB. Therefore, when uplink control is not needed (e.g. three instances), the PRB can be immediately used for scheduled transmission in the uplink. For scheduled transmissions, the allocated physical resource for ACK/NACK in the uplink is hard-coded to the allocation in downlink (e.g. allocation specific). In this exemplary embodiment the eNodeB may be able to plan ahead in physical resource allocation.

Figure 1:
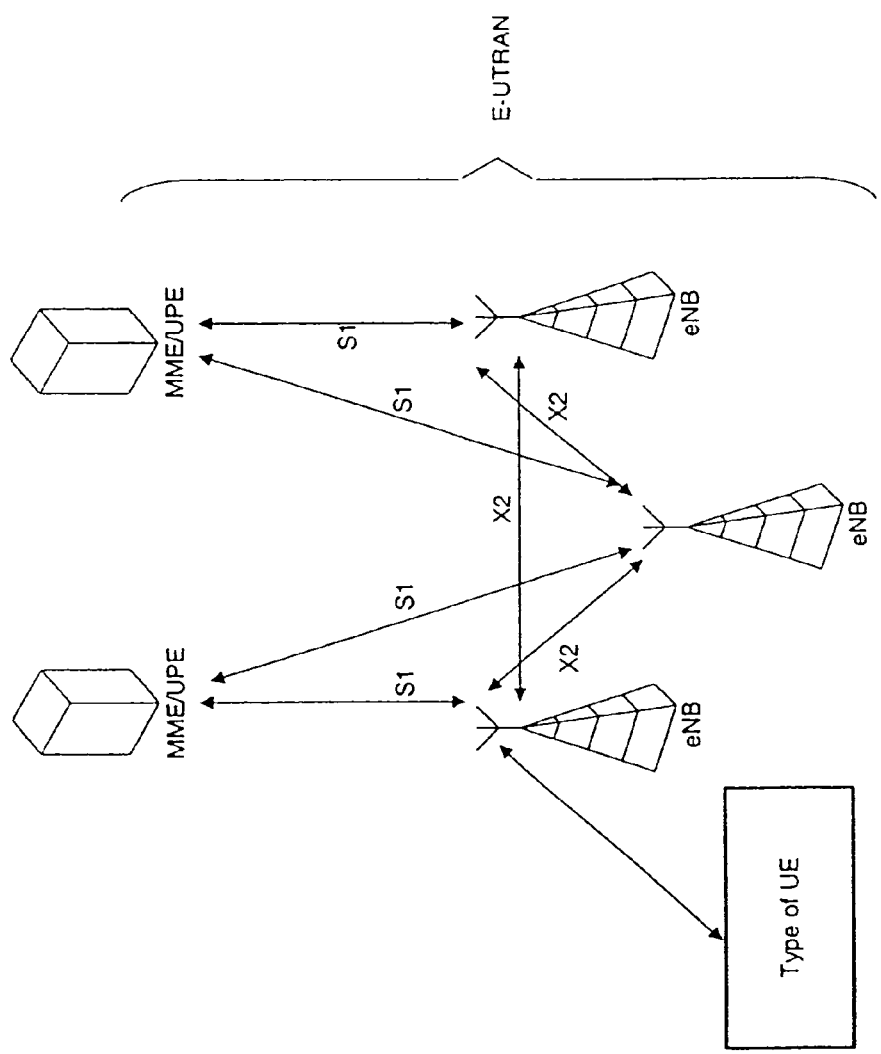
FIG. 1 illustrates an exemplary E-UTRAN architecture.

The approach is exemplified in FIG. 2. In the example as shown in FIG. 1, two PRBs are allocated to control signalling, and a total of 6 ACK/NACK reports can fit within the allocated area. When a user, i.e. UE, is allocated in downlink, the user knows which of the 6 dedicated control resources it must use based on its order in the allocation table. For persistent or non-scheduled allocations, the mapping between downlink packet and associated uplink resource may be given by higher layer (or alternative L1/L2) signaling. Here L1 and L2 are air interface Layers 1 and 2. Layer 1 is known as the physical layer and Layer 2 a data link layer which comprises two sublayers: a media access control (MAC) and a logic link control (LLC) sublayers. This L1/L2 signaling is referred to as some control signaling means, which are located below the RRC layer. With this L1/L2 signaling, it is possible to have control messages transmitted by the MAC, which would then be in control of the control signaling resource for persistent allocations.

The scheme illustrated in FIG. 2 is useful in reducing the fading margin. If needed, a user equipment terminal (UE) can detect from the allocation table (uplink allocation transmitted in downlink) if the control channel PRBs are scheduled and then "ACK/NACK control channels" may be defined according to preset or predetermined rules. For example, if a second control PRB as shown in FIG. 3 is suddenly allocated for data transmission, the UE would know there are now just 3 available control channels for the ACK/NACK report, and that distributed transmission would not be possible. As also shown in FIG. 3, when the second PRB is not allocated, then there are 6 ACK/NACK "spaces" distributed over the two PRBs.

Figure 6:
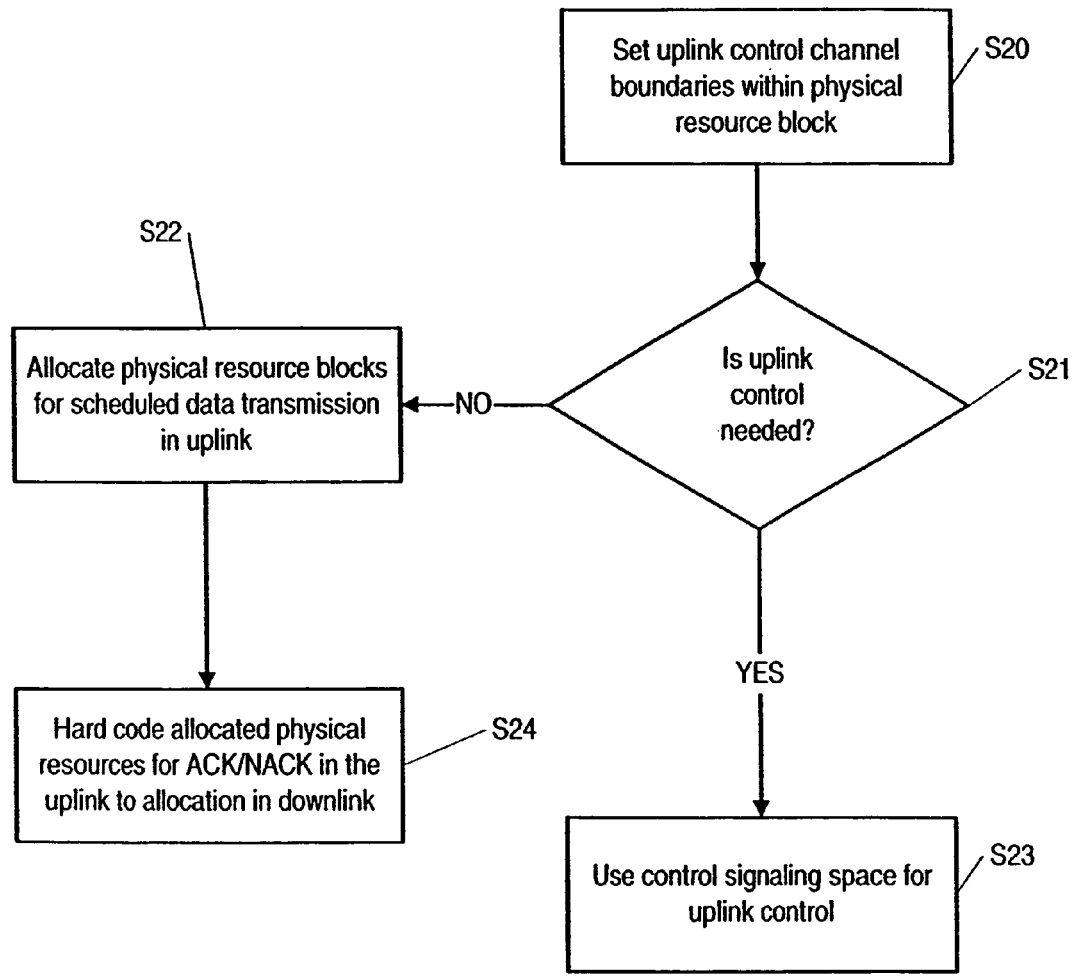
FIG. 6 illustrates another exemplary method according to an embodiment of the present invention.

A method according to this exemplary embodiment is shown in FIG. 6. The method may include a step S20 of setting uplink control channel boundaries within a physical resource block (PRB). For example, FIG. 2 shows dedicated control channels within the PRB for ACK/NACK reports. The method may also include a step S21 of deciding whether uplink control is needed. If uplink control is needed, then the method includes a step S23 of using control signalling space for uplink control. However, if it is determined that uplink control is not needed, i.e. there is available control signalling space, then the method may include a step S22 of allocating scheduled data transmission to the physical resource blocks. In that case, the method may further include a step S24 of hard coding the allocated physical resources for ACK/NACK reports in the uplink to allocation in the downlink.

In an exemplary embodiment of the invention, the eNodeB may allocate uplink resources for ACK/NACK reports according to the worst-case multiplexing requirements, and may also consider the probability of data-non-associated ACK/NACK, i.e. ACK/NACK reports that are not piggy-backed to data transmissions. For example, if the eNodeB assumes a multiplexing limit per subframe of 6 (including both semi-static and scheduled transmission), it needs to allocate two PRBs for signaling.

According to an exemplary embodiment of the present invention, the eNodeB can dynamically use parts of the space allocated for uplink ACK/NACK control (or other needed control on dedicated channel) for scheduling user data in the uplink when the eNodeB knows that this control signaling space will not be used by any user, i.e. any user equipment terminals (UEs), in a cell served by the eNodeB. For example, if only 1-3 users are multiplexed in a certain downlink subframe, the eNodeB can schedule data transmissions in the second PRB, which has been allocated for control signalling as shown in FIG. 2, for the uplink subframe where the ACK/NACK reports would normally be sent.

Figure 4:
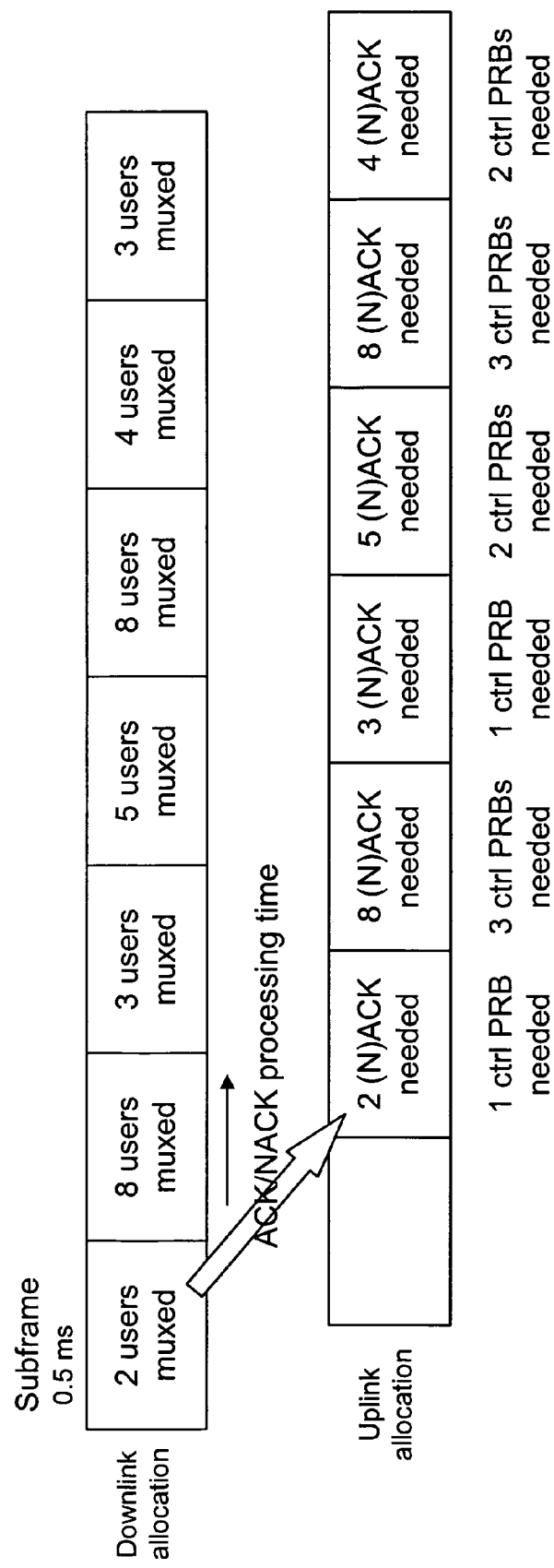
FIG. 4 illustrates an example of the relation between downlink allocation and required uplink ACK/NACK resources, with data-non-associated transmission in the uplink.

For example, FIG. 4 shows the allocation in downlink, taking into consideration how many users and/or packets are multiplexed within each subframe. FIG. 4 also shows the processing time of the UE and when the ACK/NACK report associated with a certain subframe need be transmitted from each of the receiving UE. In the example as shown in FIG. 4, maximally 8 packets are multiplexed within a subframe and this requires 3 control PRBs for a maximum PRB allocation. FIG. 4 shows the actual need of PRBs for control information below the uplink allocation boxes. In the mapping of semi-static users to the control PRBs, the users should be grouped such that they do not prevent freeing of control PRBs. For example, it may not be efficient to allocate persistent users to different control PRBs. It is understood that semi-static users are users that are allocated resources in a semi-static manner, i.e. they are allocated resources once, and then this allocation is valid for a certain period of time, or until the resource is taken away again. For example, one persistent allocation pattern would be to have a user allocated a resource every $10^{th}$ TTI. Accordingly, both the UE and the eNodeB know when the resource is allocated for the user, and there is no need to use resource allocation overhead for this user. However, as these users are not known by other scheduled users, these semi-static allocated users may be treated differently.

Figure 5:
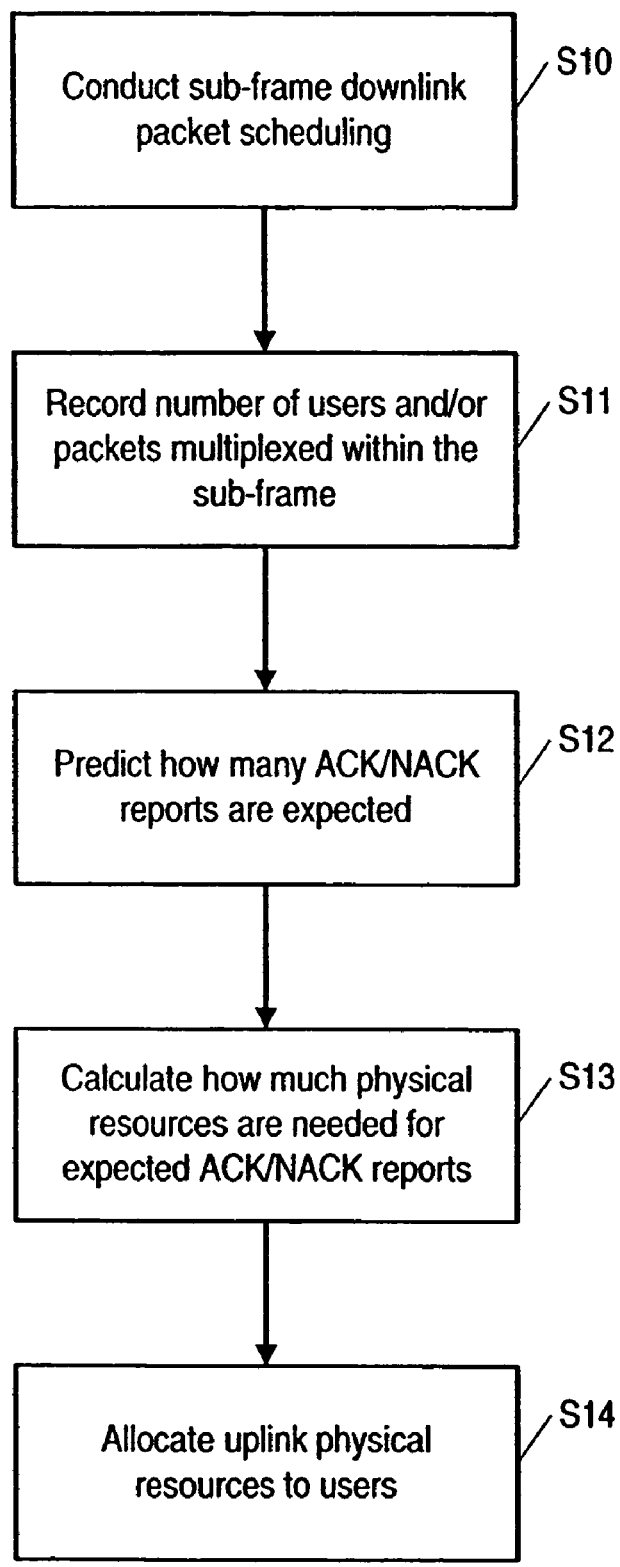
FIG. 5 illustrates an exemplary method according to an embodiment of the present invention.

FIG. 5 shows an exemplary method according to an embodiment of the present invention. The method shown in FIG. 5 may be carried out in a eNodeB. In the method, the eNodeB may conduct downlink packet scheduling for a sub-frame, for example sub-frame 'n,' in step S10. The eNodeB may then record the number of users and/or packets multiplexed within the downlink sub-frame 'n,' including semi-static allocations in step S11. The eNodeB may then predict how many ACK/NACK reports are expected from the users/user equipment terminals (UEs) in step S12. For delayed uplink allocation, the eNodeB may then calculate how much dedicated resource space is needed for the ACK/NACK reports in step S13. In calculating the amount of dedicated resource space required, the eNodeB may take into consideration when the ACK/NACK reports will be transmitted, and whether some of the ACK/NACK reports can be piggy-backed to uplink data transmission for some of the users/UEs in a data-associated control signaling scheme.

For example, if there are k1 scheduled downlink users and k2 persistently scheduled downlink users, there would be k=k1+k2 scheduled users for sub-frame 'n', who would need the control signaling of the ACK/NACK reports in the uplink. If persistent scheduling is not implemented in downlink, then k2 is '0'. Since uplink and downlink allocations are disconnected/uncorrelated, there would be m=m1+m2 allocations in the uplink, if there is piggy-backed ACK/NACK signaling. Here m1 denotes scheduled users and m2 denotes persistently scheduled users. If m3 uplink users, with m3 being a subset of the m, are able to carry their own uplink control signaling, then m4 users (m4=m−m3) will have to transmit their ACK/NACK signaling using data-non-associated transmission. Knowing the number of data-non-associated users within one PRB, it is possible to calculate how many uplink resources need be reserved for the control signaling. Accordingly, the method shown in FIG. 5 may also include a step S14 of allocating users in the uplink in unused 'control signaling reserved' PRBs based on how many uplink resources are needed to be reserved for the control signalling.

Depending on how the mapping scheme is devised, it is possible to adjust the probabilities of freeing ACK/NACK resources also considering the data-associated ACK/NACKs.

When an eNodeB is used to schedule users on a shared channel in a transmission time interval (TTI), the eNodeB allocates the uplink physical resources for data-non-associated control signaling based on the current amount of the physical resources for downlink transmission, or the allocation history of the downlink transmission. The amount of physical resources for downlink transmission is determined at least partly based on the number of users, i.e. user equipment terminals, and/or the number of packets multiplexed within a downlink subframe in a physical resource block (PRB). The eNodeB is also adapted to allocate uplink physical resources for data transmission based on amount of physical resources allocated for transmission of data-non-associated control signaling.

For delayed uplink allocation, the amount of allocated physical resources for data-non-associated control signaling is also estimated based on whether the data-non-associated control signaling can be piggy-backed to uplink data transmission. The users for which the amount of uplink physical resources for data-non-associated control signaling is allocated include users in semi-static locations.

Figure 7:
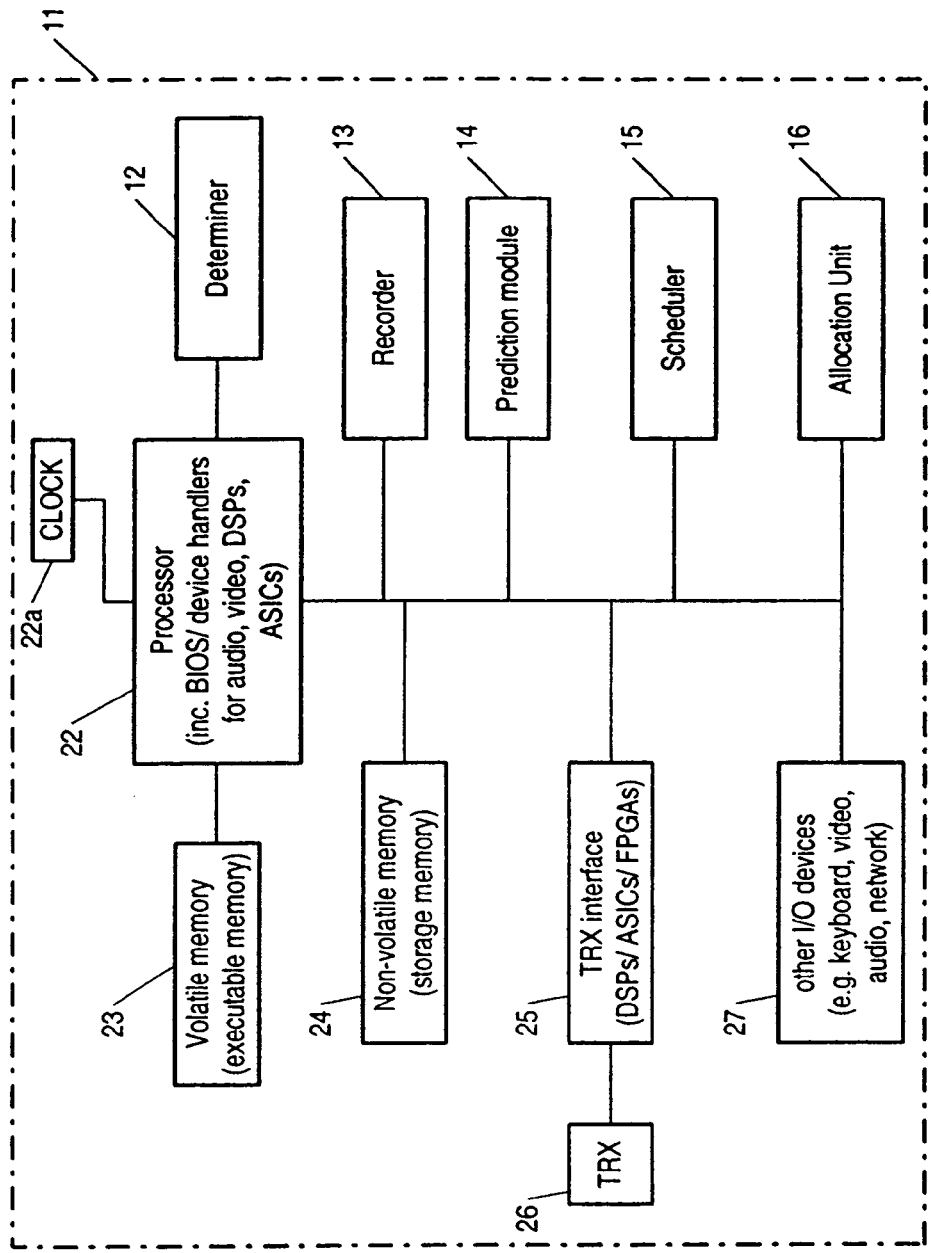
FIG. 7 illustrates a block diagram for an apparatus that is configured to carry out the present invention.

FIG. 7 shows some components of an apparatus 11 that may be included in a network element, such the eNode B discussed in relation to exemplary embodiments of the present invention. The apparatus may include a processor 22 for controlling operation of the device, including all input and output. The processor 22, whose speed/timing is regulated by a clock 22a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 26 via a TRX interface 25 including possibly one or more digital signal processors (DSPs), application specific integrated circuits (ASICs), and/or field programmable gate arrays (FPGAs). The TRX enables communication over the air with another similarly equipped communication terminal. The apparatus 11 may also include volatile memory, i.e. so-called executable memory 23, and also non-volatile memory 24, i.e. storage memory. The processor 22 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Still referring to FIG. 7, the apparatus 11 may also include a scheduler 15 for scheduling downlink packets in a sub-frame. The apparatus 11 may further include a recorder 13 for recording the number of users and/or packets multiplexed within the sub-frame. The apparatus 11 may also include a prediction module 14 that may be responsive to the recorded number of multiplexed users and/or packets for predicting a number of expected ACK/NACK reports. The apparatus 11 may also include a determiner 12 that can be responsive to the predicted number of expected ACK/NACK reports for determining how much dedicated resource space is required for the expected ACK/NACK reports. The apparatus 11 may further include an allocation unit for allocating users/UEs to the unused physical resources, i.e. unused PRBs.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention can be provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention.

What is claimed is:

1. A method, comprising:
   determining an amount of physical resources for downlink transmission; and
   allocating uplink physical resources for transmission of data-non-associated control signaling based at least on the amount of physical resources for downlink transmission; wherein the amount of physical resources for downlink transmission comprises an amount of downlink control signaling, wherein the amount of physical resources for downlink transmission is at least determined partly based on number of user equipment terminals multiplexed within a downlink subframe in a physical resource block, wherein uplink control channel boundaries for each of the user equipment terminals are allocated within boundaries of a single physical resource block.

2. The method of claim 1, wherein determining the amount of physical resources for downlink transmission is at least partly based on a number of packets multiplexed within a downlink subframe in a physical resource block.

3. The method of claim 1, further comprising:
   allocating uplink physical resources for data transmission based at least on the amount of uplink physical resources allocated for transmission of data-non-associated control signaling.

4. The method of claim 1, wherein determining the amount of physical resources for downlink transmission is based on whether the data-non-associated control signaling is at least partly incorporated into uplink data transmission.

5. The method of claim 1, wherein the amount of physical resources for downlink transmission comprises physical resources allocated for current transmission.

6. The method of claim 1, wherein the amount of physical resources for downlink transmission comprises physical resources allocated for past transmission.

7. The method of claim 1, wherein the user equipment terminals comprise user equipment terminals with semi-static resource allocations.

8. A non-transitory computer program product comprising a computer readable storage structure embodying computer program code thereon for execution by a computer processor, wherein said computer program code comprises instructions for performing a method according to claim 1.

9. The method of claim 1, wherein determining the amount of physical resources for downlink transmission is at least partly based on number of user equipment terminals multiplexed within a downlink subframe in a physical resource block.

10. An apparatus, comprising:
    a determiner for determining an amount of physical resources for downlink transmission;
    an allocation unit for allocating uplink physical resources for transmission of data-non-associated control signaling based at least on the amount of physical resources for downlink transmission; wherein the amount of physical resources for downlink transmission comprises an amount of downlink control signaling;
    a recorder for recording a number of packets multiplexed within a downlink subframe in a physical resource block, and wherein the determiner is responsive to the number of multiplexed packets for determining the amount of physical resources for downlink transmission;
    a scheduler for scheduling downlink packets; and
    a prediction module for predicting a number of expected reports based at least on the amount of physical resources for downlink transmission.

11. The apparatus of claim 10, further comprising a recorder for recording a number of user equipment terminals multiplexed within a downlink subframe in a physical resource block, and wherein the determiner is responsive to the number of multiplexed user equipment terminals for determining the amount of physical resources for downlink transmission.

12. The apparatus of claim 11, wherein the user equipment terminals comprise user equipment terminals with semi-static resource allocations.

13. The apparatus of claim 11, wherein uplink control channel boundaries for each of the user equipment terminals are allocated within boundaries of a single physical resource block.

14. The apparatus according to claim 10, wherein the apparatus comprises a network element.

15. The apparatus of claim 10, wherein the allocation unit is configured to allocate uplink physical resources for data transmission based at least on the amount of uplink physical resources allocated for transmission of data-non-associated control signaling.

16. The apparatus of claim 10, wherein the determiner is configured to determine the amount of physical resources for downlink transmission based on whether the data-non-associated control signaling is at least partly incorporated into uplink data transmission.

17. The apparatus of claim 10, wherein the amount of physical resources for downlink transmission comprises physical resources allocated for current transmission.

18. The apparatus of claim 10, wherein the amount of physical resources for downlink transmission comprises physical resources allocated for past transmission.

19. The apparatus of claim 10, further comprising a recorder for recording a number of packets multiplexed within a downlink subframe in a physical resource block, and wherein the determiner is responsive to the number of multiplexed packets for determining the amount of physical resources for downlink transmission.

20. An apparatus, comprising:
    means for determining an amount of physical resources for downlink transmission;
    means for allocating uplink physical resources for transmission of data-non-associated control signaling based at least on the amount of physical resources for downlink transmission;
    wherein the amount of physical resources for downlink transmission comprises an amount of downlink control signaling;
    means for scheduling downlink packets;
    means for predicting a number of expected reports based at least on the amount of physical resources for downlink transmission;
    means for scheduling downlink packets; and means for predicting a number of expected reports based at least on the amount of physical resources for downlink transmission.

21. The apparatus of claim 20, further comprising means for scheduling downlink packets, and means for predicting a number of expected reports based at least on the amount of physical resources for downlink transmission.

22. A system, comprising:
- a determiner for determining an amount of physical resources for downlink transmission;
- an allocation unit for allocating uplink physical resources for transmission of data-non-associated control signaling based at least on the amount of physical resources for downlink transmission;
- at least one user equipment terminal responsive to the allocation of uplink physical resources for transmission of data non-associated control signaling for providing control signaling according to the allocation;
- a scheduler for scheduling downlink packets; and
- a prediction module for predicting a number of expected reports based at least on the amount of physical resources for downlink transmission, wherein the amount of physical resources for downlink transmission comprises an amount of downlink control signaling, and wherein the amount of physical resources for downlink transmission is at least determined based on a number of packets multiplexed within a downlink subframe in a physical resource block.

23. The system according to claim 22, wherein the system further comprises a network element comprising the determiner and the allocation unit.

* * * * *